(12) United States Patent
Sumizawa et al.

(10) Patent No.: US 7,908,081 B2
(45) Date of Patent: Mar. 15, 2011

(54) NAVIGATION APPARATUS, NAVIGATION SYSTEM AND ROUTE SEARCH METHOD

(75) Inventors: Akio Sumizawa, Sagamihara (JP); Takayuki Sakakibara, Kawasaki (JP); Kenichi Maruta, Kunitachi (JP)

(73) Assignee: Xanavi Informatics Corporation, Zama-shi (JP)

( * ) Notice: Subject to any disclaimer, the term of this patent is extended or adjusted under 35 U.S.C. 154(b) by 1012 days.

(21) Appl. No.: 11/730,136

(22) Filed: Mar. 29, 2007

(65) Prior Publication Data

US 2008/0071471 A1  Mar. 20, 2008

(30) Foreign Application Priority Data

Mar. 30, 2006 (JP) ................... 2006-093365

(51) Int. Cl.
*G01C 21/30* (2006.01)
*G01C 21/32* (2006.01)
(52) U.S. Cl. .... 701/210; 701/209; 345/440; 340/995.21
(58) Field of Classification Search .......... 701/200–213; 340/995.24, 995.15, 995.14, 995.21; 345/440, 345/680
See application file for complete search history.

(56) References Cited

U.S. PATENT DOCUMENTS

| | | | | |
|---|---|---|---|---|
| 6,070,123 A * | 5/2000 | Beyer et al. | ................... | 701/209 |
| 6,289,278 B1 * | 9/2001 | Endo et al. | ................... | 701/208 |
| 6,937,935 B2 * | 8/2005 | Sato | ............................. | 701/207 |
| 7,355,528 B2 * | 4/2008 | Yamane et al. | .......... | 340/995.13 |
| 7,499,801 B2 * | 3/2009 | Sakashita et al. | ............. | 701/211 |
| 7,519,471 B2 * | 4/2009 | Shibata et al. | ................. | 701/211 |
| 2006/0009904 A1 * | 1/2006 | Sakashita et al. | ............. | 701/200 |
| 2007/0032943 A1 * | 2/2007 | Okabe | ........................... | 701/200 |
| 2007/0198178 A1 * | 8/2007 | Trimby et al. | ................ | 701/209 |
| 2007/0213924 A1 * | 9/2007 | Nagase et al. | ................ | 701/200 |
| 2010/0070164 A1 * | 3/2010 | Machino | ....................... | 701/201 |

FOREIGN PATENT DOCUMENTS

| | | |
|---|---|---|
| JP | 2000-111354 A | 4/2000 |
| JP | 2003-214861 | 7/2003 |
| JP | 2003-356500 | * 10/2003 |

(Continued)

OTHER PUBLICATIONS

Generating high precision maps for advanced guidance support; Noyer, U. et al.; Intelligent Vehicles Symposium, 2008 IEEE Digital Object Identifier: 10.1109/IVS.2008.4621193, Publication Year: 2008, pp. 871-876.*

(Continued)

*Primary Examiner* — Cuong H Nguyen
(74) *Attorney, Agent, or Firm* — Crowell & Moring LLP

(57) ABSTRACT

This navigation apparatus includes a road setting unit that sets a road to be traversed between a departure point and a destination, the road being constituted by links for each of which a predetermined link cost is set, a replacement unit that replaces the links constituting the road to be traversed that has been set by the road setting unit, with a virtual link whose link cost is set to be smaller than the total of the link costs of the links for the road to be traversed, and a route search unit that searches for a recommended route from the departure point to the destination, based upon link costs set for links that constitute roads other than the road to be traversed, and the link cost set for the virtual link with which the road to be traversed has been replaced by the replacement unit.

17 Claims, 4 Drawing Sheets

FOREIGN PATENT DOCUMENTS

| | | | |
|---|---|---|---|
| JP | 2003-361385 | * | 10/2003 |
| JP | 2004-200632 | * | 7/2004 |
| JP | 2004-223683 | * | 7/2004 |
| JP | 2004-301807 | * | 10/2004 |
| JP | 2005-140819 | | 6/2005 |
| JP | 2006-029812 | | 2/2006 |
| WO | PCT/JP04/19309 | * | 7/2006 |

OTHER PUBLICATIONS

Tight coupling of GPS, laser scanner, and inertial measurements for navigation in urban environments; Soloviev, A.; Position, Location and Navigation Symposium, 2008 IEEE/ION; Digital Object Identifier: 10.1109/PLANS.2008.4570059; Publication Year: 2008, pp. 511-525.*

Mechatronics design and implementation of driver assistance technologies for Intelligent Transportation Systems; Ravani, Bahram; Service Operations and Logistics, and Informatics, 2008. IEEE/SOLI 2008. IEEE International Conference on; vol. 1; Digital Object Identifier: 10.1109/SOLI.2008.4686341; Publication Year: 2008, pp. XV-XVI.*

LADAR based obstacle detection in an urban environment and its application in the DARPA Urban challenge; Jihyu Yoon et al.; Control, Automation and Systems, 2008. ICCAS 2008. International Conference on; Digital Object Identifier: 10.1109/ICCAS.2008.4694569; Publication Year: 2008, pp. 581-585.*

Bayesian Probabilistic Vehicle Lane Matching for Link-Level In-Vehicle Navigation; Jie Du; Barth, M.; Intelligent Vehicles Symposium, 2006 IEEE; Digital Object Identifier: 10.1109/IVS.2006.1689681; Publication Year: 2006, pp. 522-527.*

Traffic in Social Media I: Paths Through Information Networks; Ratkiewicz, J.; Flammini, A.; Menczer, F.; Social Computing (SocialCom), 2010 IEEE Second International Conference on; Digital Object Identifier: 10.1109/SocialCom.2010.72 Publication Year: 2010, pp. 452-458.*

Recommendation Rule Extraction by a Neuro-Fuzzy Approach; Castellano, G.; Fanelli, A.M.; Torsello, M.A.; Hybrid Intelligent Systems, 2008. HIS '08. Eighth International Conference on; Digital Object Identifier: 10.1109/HIS.2008.18 Publication Year: 2008, pp. 758-763.*

Intelligent In-Vehicle Control and Navigation Based on Multi-Route Traffic Optimization; Zhao-Sheng Yang; Chang-Qing Cai; Li-Xia Bao; Machine Learning and Cybernetics, 2006 International Conference on; Digital Object Identifier: 10.1109/ICMLC.2006.258524; Publication Year: 2006, pp. 962-966.*

Route Selection for Vehicle Navigation and Control; Pang, G.; Ming-Hei Chu; Industrial Electronics Society, 2007. IECON 2007. 33rd Annual Conference of the IEEE; Digital Object Identifier: 10.1109/IECON.2007.4459980; Publication Year: 2007, pp. 2586-2591.*

Path-Restricted Parallel Q-Learning Algorithm in Collaborative Virtual Environment; Zhigang Wang; Li Xiao; Computational Intelligence and Software Engineering, 2009. CiSE 2009. International Conference on; Digital Object Identifier: 10.1109/CISE.2009.5363765; Publication Year: 2009, pp. 1-4.*

Driver's route choice model based on traffic signal control; Zhou Shenpei; Yan Xinping; Industrial Electronics and Applications, 2008. ICIEA 2008. 3rd IEEE Conference on; Digital Object Identifier: 10.1109/ICIEA.2008.4582934 Publication Year: 2008, pp. 2331-2334.*

Data-driven route guidance under the framework of model predictive control; Yonghua Zhou; Xu Yang; Wei Wang; Computer Science and Information Technology (ICCSIT), 2010 3rd IEEE International Conference on; vol. 1; Digital Object Identifier: 10.1109/ICCSIT.2010.5564550; Publication Year: 2010, pp. 378-383.*

Office Action in Japanese Patent Application No. 2006-093365 dated Jan. 11, 2011.

* cited by examiner

NAVIGATION APPARATUS, NAVIGATION SYSTEM AND ROUTE SEARCH METHOD

INCORPORATION BY REFERENCE

The contents of the disclosure of the following priority application are herein incorporated by reference:
Japanese Patent Application No. 2006-93365 (filed Mar. 30, 2006).

BACKGROUND OF THE INVENTION

1. Field of the Invention

The present invention relates to a navigation device that guides a driver to a set destination.

2. Description of Related Art

In the prior art a navigation device is known that, when a user traces and designates a road along which he desires to pass upon a road map displayed upon a screen, sets a route to a destination so as to pass along this designated road (refer to Japanese Patent Publication No. 2000-111354). With this navigation device, whatever the road that is designated by the user may be, the route to the destination is necessarily set so as to pass along that road. Accordingly the problem arises that, even if the road that has been designated is not appropriate, such as for example in a case in which a very circuitous detour will be made if that road is taken, still the route is set so as to pass along the designated road; and this is not desirable.

SUMMARY OF THE INVENTION

The navigation apparatus according to a first aspect of the present invention includes a road setting means that sets a road to be traversed between a departure point and a destination, the road being constituted by links for each of which a predetermined link cost is set, a replacement means that replaces the links constituting the road to be traversed that has been set by the road setting means, with a virtual link whose link cost is set to be smaller than the total of the link costs of the links for the road to be traversed, and a route search means that searches for a recommended route from the departure point to the destination, based upon link costs set for links that constitute roads other than the road to be traversed, and the link cost set for the virtual link with which the road to be traversed has been replaced by the replacement means.

According to a second aspect of the present invention, in a navigation apparatus according to the first aspect thereof, it is desirable for the road setting means to set, as the road to be traversed, a road designated by the user upon a map displayed upon a display monitor.

According to a third aspect of the present invention, in a navigation apparatus according to the first or the second aspect thereof, it is desirable, if specific traffic regulation information is set for any one of the links that constitute the road to be traversed, for the replacement means also to set traffic regulation information with the same details for the virtual link.

According to a fourth aspect of the present invention, in a navigation apparatus according to any one of the first through the third aspects thereof, the navigation apparatus further includes a decision means that decides whether or not to use the virtual link. With this navigation apparatus it is desirable, if it has been decided by the decision means not to use the virtual link, for the route search means to search for the recommended route, not using the virtual link, but rather based upon the link costs set for each of the links that constitute the road to be traversed, and the link costs set for the links that constitute the roads other than the road to be traversed.

According to a fifth aspect of the present invention, in a navigation apparatus according to the fourth aspect thereof, it is desirable for the decision means to decide whether or not to use the virtual link, based upon a set result of a search condition set in advance by the user for the recommended route.

According to a sixth aspect of the present invention, in a navigation apparatus according to the fourth aspect thereof, it would also be acceptable to arrange for the decision means to decide whether or not to use the virtual link, based upon the calendar and/or time.

According to a seventh aspect of the present invention, in a navigation apparatus according to any one of the first through the sixth aspects thereof, the navigation apparatus further includes a rerouting means that, if a subject vehicle deviates from the recommended route, conducts a reroute search for a new recommended route to the destination, using a position of the subject vehicle at this time as a departure point. With this navigation apparatus it is desirable, if the subject vehicle deviates from the road to be traversed that is included in the recommended route, for the rerouting means to conduct a reroute search for the new recommended route, based upon the link costs set for each of the links that constitute the road to be traversed, and the link costs set for the links that constitute the roads other than the road to be traversed, without using the virtual link.

According to an eighth aspect of the present invention, in a navigation apparatus according to any one of the first through the seventh aspects thereof, it is desirable that the navigation apparatus further includes a congestion decision means that decides upon the state of congestion of the road to be traversed, and a link cost change means that changes the link cost set for the virtual link, according to the result of decision of congestion state for the road to be traversed by the congestion decision means.

According to a ninth aspect of the present invention, in a navigation apparatus according to the eighth aspect thereof, the congestion decision means decides upon the state of congestion of the road to be traversed, based upon road traffic information that is transmitted by vehicle Information and Communication System Center.

According to a tenth aspect of the present invention, in a navigation apparatus according to the eighth aspect thereof, it would also be acceptable to arrange for the congestion decision means to decide upon the state of congestion of the road to be traversed, based upon statistical traffic information in which past states of congestion for each day of the week or time are recorded.

A navigation system according to an eleventh aspect of the present invention includes a navigation apparatus according to any one of the first through the tenth aspects thereof, a data base means in which information about roads along which various types of user preferentially pass is recorded, a road to be traversed determination means that determines a road to be traversed, based upon the information recorded in the data base means, and a transmission means that transmits, to the navigation apparatus, information of the road to be traversed for specifying upon a map the road to be traversed that has been determined by the road to the traversed determination means. With this navigation system, it is desirable for the road setting means to set the road to be traversed based upon the information of the road to be traversed that is transmitted from the transmission means.

A route search method for a navigation apparatus according to a twelfth aspect of the present invention comprises setting a road to be traversed between a departure point and a destination, the road being constituted by links for each of which a predetermined link cost is set, replacing the links constituting the road to be traversed with a virtual link whose link cost is set to be smaller than the total of the link costs of the links, and searching for a recommended route from the departure point to the destination, based upon link costs set for links that constitute roads other than the road to be traversed, and the link cost set for the virtual link with which the road to be traversed has been replaced.

A route search method for a navigation system according to a thirteenth aspect of the present invention comprises determining a road to be traversed based upon information about roads along which various types of user preferentially pass recorded in a data base, transmitting information of the road to be traversed for specifying upon a map the road to be traversed that has been determined, setting the road to be traversed between a departure point and a destination, the road being constituted by links for each of which a predetermined link cost is set, based upon the information of the road to be traversed that is transmitted, replacing the links constituting the road to be traversed with a virtual link whose link cost is set to be smaller than the total of the link costs of the links, and searching for a recommended route from the departure point to the destination, based upon link costs set for links that constitute roads other than the road to be traversed, and the link cost set for the virtual link with which the road to be traversed has been replaced.

DETAILED DESCRIPTION OF THE PREFERRED EMBODIMENTS

Figure 1:
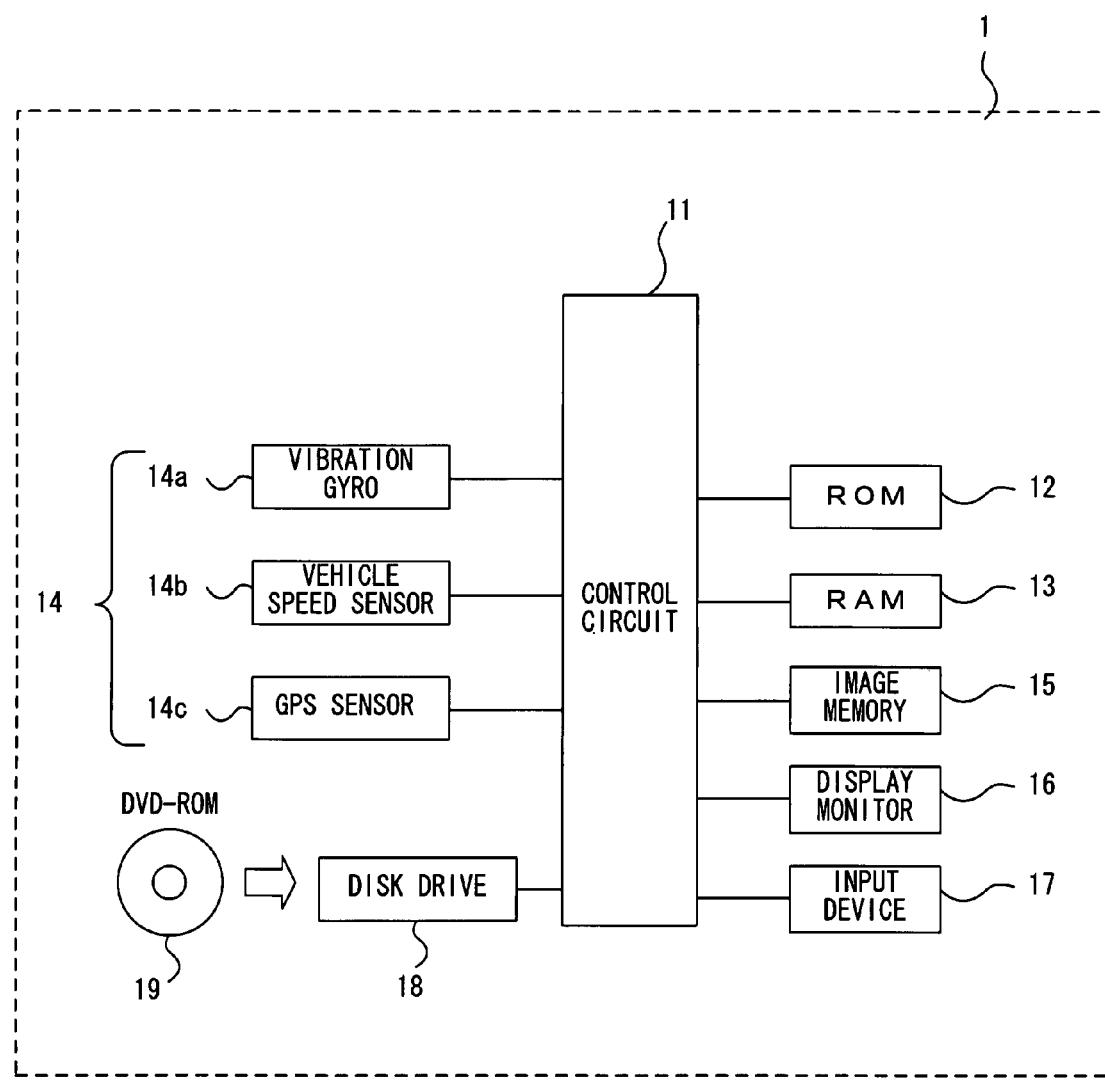
FIG. 1 is a block diagram showing the structure of a navigation device according to an embodiment of the present invention.

The structure of a navigation apparatus according to an embodiment of the present invention is shown in FIG. 1. This navigation apparatus is used when mounted to a vehicle, and when a destination is set by the user, who is the driver of the vehicle, it searches for a recommended route to the destination, and guides the user to the destination according to the recommended route that has been found. Furthermore, if during this search for a recommended route the user designates a road that he wants to pass along en route, this navigation apparatus is adapted so as to be able to perform the search for the recommended route so as to pass along this designated road.

The navigation apparatus shown in FIG. 1 includes a control circuit 11, a ROM 12, a RAM 13, a current position detection device 14, an image memory 15, a display monitor 16, an input device 17, and a disk drive 18. A DVD-ROM 19 upon which map data is recorded is loaded into the disk drive 18. The control circuit 11 consists of a micro processor and its peripheral circuitry, and executes a control program that is stored in the ROM 12, using the RAM 13 as a work area. In this manner, various types of processing and control are performed by the navigation device 1, such as for example setting a destination, searching for a recommended route, displaying a map, and the like.

The current position detection device 14 is a device that detects the current position of the vehicle, in other words the vehicle position, and it consists of various types of sensor, such as for example an vibration gyro sensor 14a that detects the direction of progression of the vehicle, a vehicle speed sensor 14b that detects the vehicle speed, a GPS sensor 14c that detects GPS signals from the GPS satellites, and so on. Based upon the position of the vehicle detected by this current position detection device 14, the navigation apparatus 1 is able to determine a route search start point that will be described hereinafter, and to display a vehicle position mark upon a map.

The image memory 15 temporarily stores image data for display upon the display monitor 16. This image data consists of map drawing data for displaying a map, and various types of graphic data and the like, and is created by the control circuit 11 based upon the map data recorded in the DVD-ROM 19 and the like. By this image data that has been created being outputted from the control circuit 11 to the image memory 15, a map is displayed upon the display monitor 16.

The input device 17 includes various types of input switch for the user to set a destination for the vehicle or a place to pass through (hereinafter these will simply be collectively referred to as the destination). This input device 17 is implemented as an actuation panel or a remote control or the like. By actuating the input device 17 according to instructions of the screen that are displayed upon the display monitor 16, the user is able to designate a place name or a position upon the map or the like and to set it as the destination.

The disk drive 18 reads out map data for displaying a map from the DVD-ROM 19 that is loaded therein. This map data includes route calculation data that is used for route searching, route guidance data such as names of intersection points or road names or the like that is used for guiding the vehicle to the destination according to a recommended route, road data that shows roads, and the like. Furthermore, background data that shows rivers and railroads, various types of facilities (landmarks) and so on upon the map, map elements other than roads, and the like, is also included in this map data.

The minimum units that show road sections in this road data are termed links. In other words, each road is made up of a plurality of links that are set for each predetermined road section. It should be understood that the lengths of the road sections that are set according to the links vary; the lengths of the links are not fixed. The points that connect between the links are termed nodes, and each node has its own position information (coordinate information). Furthermore, sometimes so-called shape interpolation points are set between the nodes, within the links. These shape interpolation points have their own position information (coordinate information), just like the nodes. The link shapes, in other words the shapes of the roads, are determined by the position information of these nodes and shape interpolation points. In the route calculation data, corresponding to each of the links described above, a value termed the link cost is set for showing the time period that is required for the vehicle to pass along that link.

It should be understood that, although here the use of a DVD-ROM has been explained by way of example, it would also be acceptable to arrange to read out the map data from some recording medium other than a DVD-ROM: for example, from a CD-ROM or a hard disk or a memory card or the like. Or it would also be acceptable to arrange to receive map data that is transmitted from the outside via a portable telephone circuit or the like, and to use this map data. In other words, it would be acceptable to use any type of method of acquiring the map data.

When the user sets a destination by actuating the input device 17, the navigation apparatus 1 performs route search calculation to this destination from the current position by performing a predetermined algorithmic calculation based upon the route calculation data described above, taking the current position detected by the current position detection device 14 as a route search start point. In this route search calculation, the link costs that are set for each link to be traversed from the current position to the destination are totaled, and that route for which this value becomes a minimum is obtained as the recommended route.

This recommended route that has been obtained as a result of the route search calculation is shown upon the map as distinguished from the other roads by its display format, such as for example its display color or the like, being changed. By doing this, the user is able to recognize the recommended route upon the map that is being displayed upon the display monitor 16. Furthermore, the navigation apparatus 1 guides the vehicle by instructing the direction of progression to the user, via images or audio or the like, so that the vehicle can be driven according to this recommended route. In this manner, route guidance to the destination is performed by displaying the map and guiding the vehicle to the destination according to the recommended route.

During this search for the recommended route in the manner described above, the user is also able to designate some road upon the map that he considers that he would like to pass along en route towards the destination. For example, the display monitor 16 may be made as a touch panel, and the user may designate the road that he considers that he would like to pass along by performing the operation of tracing it upon the map displayed upon this screen with a pen or a finger or the like. Or it would also be acceptable to arrange for him to designate the road that he considers that he would like to pass along by shifting a cursor upon the map displayed upon the display monitor 16, using cursor keys that are installed upon the actuation panel or the remote control as one section of the input device 17. A road that has been designated in this manner will hereinafter be termed the "road to be traversed". It should be understood that the method explained above of designating the road to be traversed is only one example; it would also be acceptable to utilize some other method.

When the user designates a road to be traversed as explained above, the plurality of links that constitute this road to be traversed are all collectively replaced by a single virtual link. Thus, such a virtual link is expressed as a single link by grouping together the plurality of links that constitute the road to be traversed. For this virtual link, a link cost is set that is smaller than the total of the link costs that were set for the original plurality of links. And a route search calculation as described previously is performed, using this link cost of this virtual link that is smaller than the original link cost for the road to be traversed. As a result, a recommended route is found such that it follows this road to be traversed that has been designated.

Figure 2:
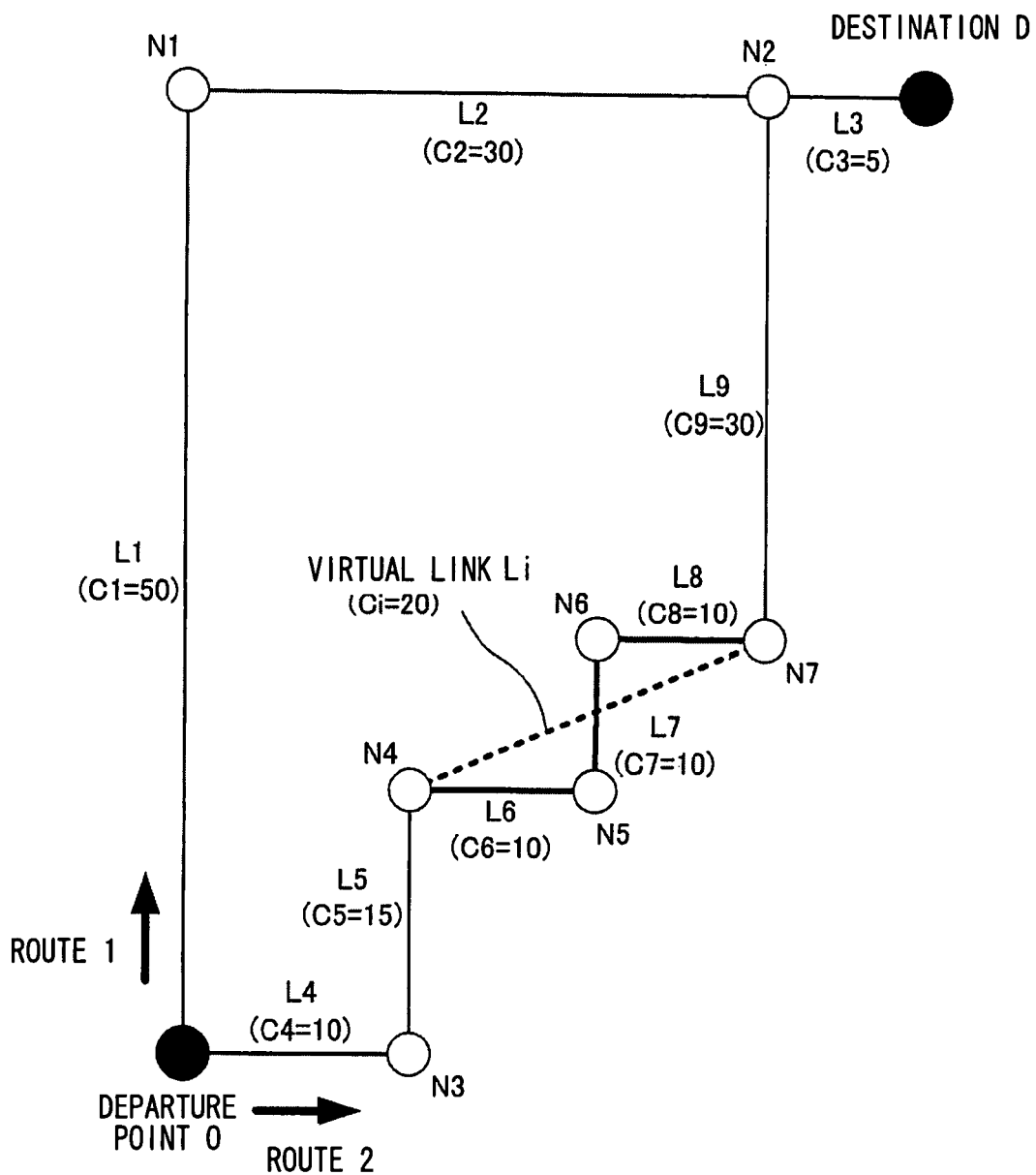
FIG. 2 is a figure showing a concrete example for explanation of a method for searching for a recommended route.

In the following, explanation will be provided of the search method for the recommended route according to a concrete example. It is supposed that, as shown in FIG. 2, a plurality of roads shown by the links L1 through L9 exist from the departure point O, which is the current position, to the destination D. Each of these links connects via respective ones of the nodes N1 through N7. For example, the link L1 and the link L2 are connected via the node N1, and the links L2, L3, and L9 are connected via the node N2.

Link costs are set for the links L1 through L9, having respective values corresponding to the time periods that are required to traverse them. For example, a value of C1=50 is set for the link cost of the link L1, while a value of C2=30 is set for the link cost of the link L2. Link costs C3 through C9 are also set for the other links L3 through L9. The values of these link costs are determined in advance based upon the speed limits for these roads, or the like.

First the case will be explained in which, in FIG. 2, a search is made for a recommended route to the destination, without the user designating any road to be traversed. In this case a group of links are obtained by route search calculation so that, when the departure point O and the destination D have been connected, the value of the total of these link costs becomes a minimum. The route that is constituted by the set of links obtained in this manner is set as the recommended route. In the case of FIG. 2, the groups of links that connect from the departure point ) to the destination D are the group consisting of the links L1, L2 and L3, and the group consisting of the links L4, L5, L6, L7, L8, L9 and L3. If the route that is constituted by the former group is termed Route #1, and the route that is constituted by the latter group is termed Route #2, then the value of the total of the link costs for Route #1 is 50+30+5=85, and the value of the total of the link costs for Route #2 is 10+15+10+10+10+30+5=90. Accordingly, Route #1 is obtained as the recommended route.

Next, the case will be explained in which, in FIG. 2, a search is made for a recommended route to the destination, after the user has designated a road to be traversed by the method described previously. In this case, before performing the route search calculation, the links that constitute the road to be traversed that has been designated by the user are combined and replaced by a virtual link. Here, it is supposed that the links L6, L7 and L8 are replaced by the virtual link Li. A value for link cost is set for this virtual link Li that is smaller than the value of the total of the link costs that are set for the group of original links. Here, it is supposed that Ci=20, that is smaller than the value of the total 10+10+10=30 of the link costs for the original links L6, L7 and L8, is set as the value of the link cost for the virtual link Li.

When the links L6, L7 and L8 are replaced by the virtual link Li, flag information is appended for the original links L6, L7 and L8 that indicates that they have been replaced by the virtual link. Furthermore, a correspondence table is created that specifies the correspondence relationship between the links L6, L7 and L8 and the virtual link Li. Due to this, when performing the route search calculation, if there is a link to which flag information is appended, then it is possible to decide by which virtual link this link has been replaced, by referring to this correspondence table.

When the links L6, L7 and L8 that constitute the road to be traversed are replaced in this manner by the virtual link Li, the route search calculation is performed, and the group of links is obtained for which the total of the values of the link costs when connecting the departure point O to the destination D becomes a minimum. At this time, for the road to be traversed, the link cost is used that has been set for the replacement virtual link Li, while, for the roads other than the road to be traversed, the link costs are used that have respectively been set for the links that constitute those roads. Since, as a result, the total value of the link cost for Route #2 becomes 10+15+20+30+5=80, therefore this becomes smaller than the total value of the link cost for Route #1. Accordingly, Route #2 is obtained as the recommended route.

It should be understood that, when displaying Route #2 that has been obtained as the recommended route by performing the procedure described above upon the map, the road to be traversed is displayed based upon the link information for the original links L6, L7 and L8, and not based upon the virtual link Li. Furthermore, when performing route guidance for the road to be traversed, the instructions for the direction of progression are issued according to the link information for the original links L6, L7 and L8 as well. By doing this, it is possible to perform display upon the map, and route guidance, correctly according to the actual road to be traversed.

Furthermore, if traffic regulation information that specifies a one way street or a prohibited right turn or the like is set for the original links L6, L7 and L8 for the road to be traversed, then traffic regulation information with the same details is set for the virtual link Li after replacement. For example, if the end of the link L8 is a prohibited right turn, then the end of the virtual link Li is also made to be a prohibited right turn. Due to this, it is possible to prevent a recommended route such as one that cannot actually be traversed being mistakenly found as a result of performing the route search calculation using the virtual link, which would be undesirable.

Next, an explanation of rerouting processing will be performed. If, while proceeding towards the destination, the vehicle has deviated from the recommended route, then, by the control circuit 11 executing so-called rerouting processing, a new recommended route from the vehicle position to the destination is automatically found again. This rerouting processing is performed by performing the route search calculation while taking the vehicle position when the vehicle has deviated from the recommended route as a new departure point. In other words, when a deviation from the recommended route takes place, that group of links for which the total of the values of the costs of the links that connect from the vehicle position at this time point to the destination becomes a minimum is obtained by the route search calculation. By executing the rerouting processing in this manner, a new recommended route is obtained.

Here, the above type of rerouting processing is supposed to be executed when the vehicle deviates from the road to be traversed that has been designated by the user. In this case, the virtual link is not used for the road to be traversed, but rather the route search calculation during rerouting processing is performed using the original links before replacement by the virtual links. In other words, in the example of FIG. 2, that group of links is obtained for which the total of the values of the costs of the links becomes a minimum, not based upon the link cost Ci of the virtual link Li, but rather based upon the link costs C6, C7 and C8 of the links L6, L7 and L8. By doing this if, while traversing the road to be traversed that has been set as a portion of the recommended route, the user stops traversing this road to be traversed en route, then it is possible to search again for an appropriate recommended route by this rerouting processing. It should be understood that, if a plurality of roads to be traversed are designated, it would be acceptable to arrange not to use only that virtual link that corresponds to the road to be traversed that has been deviated from; or, alternatively, it would also be acceptable not to use the virtual links for all of the roads to be traversed.

In the example of FIG. 2, the link cost Ci=20 of the virtual link Li is only an example; any value would be acceptable for the link cost that is set for the virtual link Li, provided that it is smaller than the total of the values of the costs of the links C6, C7 and C8. In other words, it is possible to set the link cost of the virtual link by decreasing the link cost of the original links that constitute the road to be traversed in any desired proportion.

It should be understood that the possibility of the recommended route passing along the road to be traversed that has been designated is the higher, the smaller is the value of the link cost of the virtual link that is set, as compared to the costs of the original links. However, if the link cost of the virtual link is set to a very small value, which is undesirable, then still a recommended route is set that passes along the designated road to be traversed, even if for example a very circuitous detour occurs if this road to be traversed is pursued. Accordingly, it is desirable to set an appropriate value of the link cost for the virtual link in terms of determination of the road situation in an overall manner, so that, if the road to be traversed that has been designated is appropriate, it is possible to set the route to the destination so as to pass along the road to be traversed, and if the road to be traversed that has been designated is not appropriate, it is possible to set the route to the destination in an appropriate manner without passing along the road to be traversed.

For example it may be considered, if the required time period when passing along the road to be traversed that has been designated is within 120% of the required time period when not passing, to set the recommended route so as to pass along the road to be traversed; while, when it is greater than 120% thereof, to set the recommended route so as not to pass along the road to be traversed. In this case the link cost of the virtual link is set so that for that route, among the routes that pass along the road to be traversed from the departure point to the destination, for which the total of the values of the costs of the links thereupon becomes a minimum, the total link cost when the links for the road to be traversed have been replaced by the virtual link becomes $100/120$ of the original total link cost, in other words about 83% thereof. This is only given by way of example; it would also be possible to set the link cost of the virtual link by various other types of method.

Figure 3:
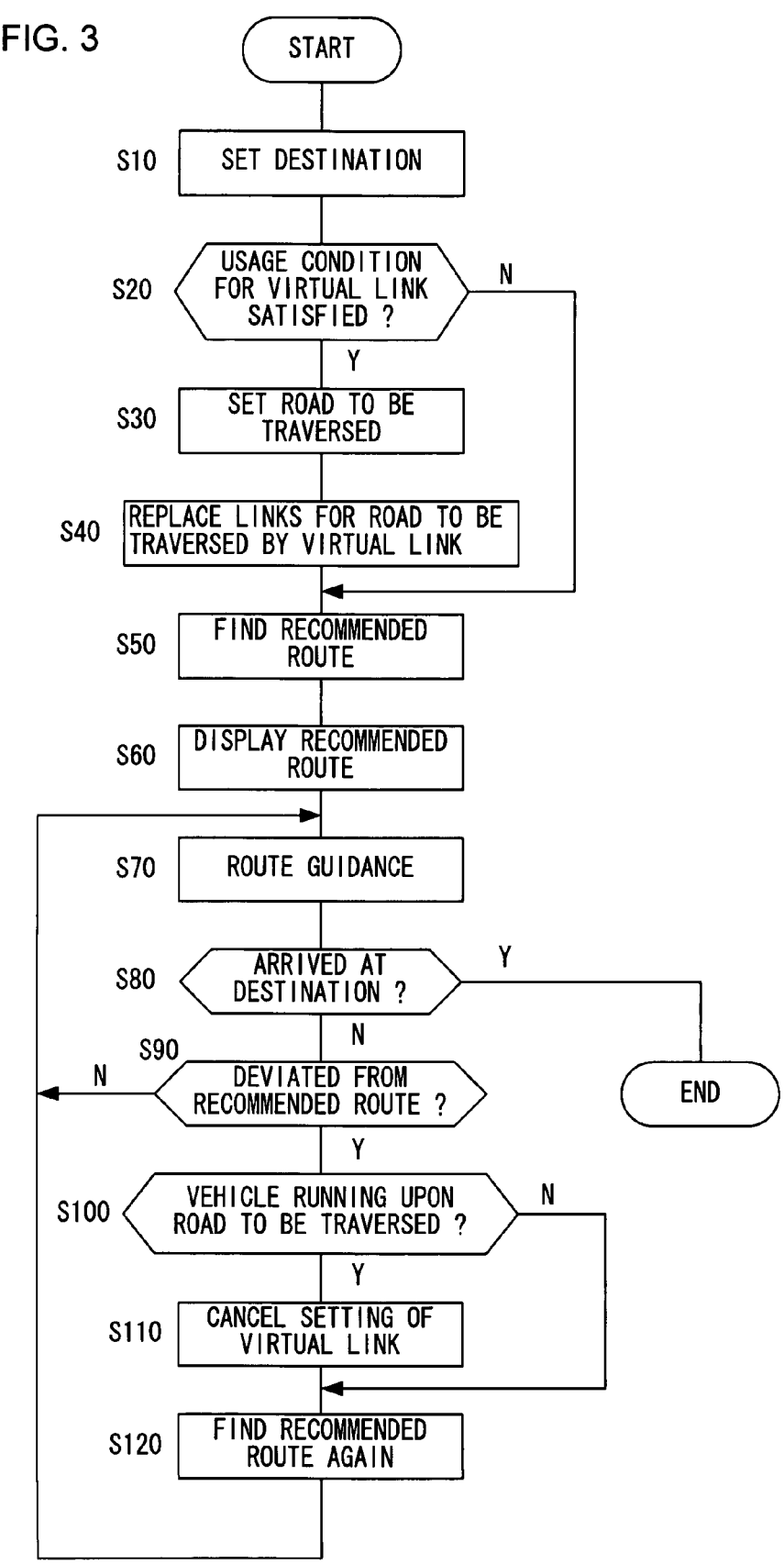
FIG. 3 is a flowchart that is executed when searching for a recommended route and guiding the vehicle to a destination.

FIG. 3 is a flowchart that is executed by the control circuit 11 when searching for a recommended route and guiding the vehicle to the destination as explained above. In the following, this flowchart will be explained in detail. In a step S10, the destination is set by place name or a position on the map being designated.

In a step S20, a decision is made as to whether or not a usage condition for the virtual link that has been set in advance is satisfied. This decision is performed based upon, for example, the calendar day or the time. In concrete terms, if a specified time period band such as morning or evening or daytime or the like, or a specified day of the week such as a holiday or a rest day or the like is applicable, then it may be decided that the usage condition for the virtual link is satisfied. It would also be acceptable to use these conditions in combination. Or, as one search condition for the recommended route, it would also be acceptable to arrange for it to be possible for the user to set in advance whether or not to use the virtual link. If the usage condition for the virtual link is satisfied, then the flow of control proceeds to a step S30, while if it is not satisfied then the flow of control is transferred to the step S60.

In the step S30, the road to be traversed that the user thinks that he wants to traverse en route to the destination is set. This setting of the road to be traversed is performed, as described above, by the user designating the road upon the map that is displayed upon the display monitor 16 by actuation of a touch panel or a cursor. Or it would also be acceptable to arrange to store a number of roads to be traversed that have been set in the past, and for the user to call these up and to select the road to be traversed that he desires. When the road to be traversed has been set, the flow of control proceeds to the next step S40.

In the step S40, the links for the road to be traversed that was set in the step S30 are replaced by the virtual link. At this time, the plurality of links that constitute the road to be traversed are combined and replaced by the single virtual link.

It should be understood that, if the road to be traversed is constituted by a single link, this link is replaced by a single virtual link. When replacing the links for the road to be traversed by the virtual link in this step S40, as previously described, flag information is appended to the links that constitute the road to be traversed, and moreover a correspondence table is created for these links and the virtual link.

In a step S50, a search for a recommended route is performed. At this time, if due to the execution of the processing in the steps S30 and S40 the road to be traversed is set and this link is replaced by the virtual link, then the route search calculation is performed based upon the link cost of the virtual link, and not upon the original link costs for this road to be traversed. On the other hand, if it has been decided in the step S20 that the usage condition for the virtual link has not been satisfied, then the route search calculation is performed without using the virtual link. As a result, the group of links for which the value of the total of the costs of the links to the destination becomes a minimum is obtained as the recommended route.

In a step S60, the recommended route obtained in the step S50 is displayed upon the map that is displayed upon the display monitor 16. At this time, for the road to be traversed that was set in the step S30, the display of the recommended route is performed based upon the original links before replacement by the virtual link.

In a step S70, route guidance in order to guide the vehicle to the destination is performed, based upon the recommended route that has been displayed upon the map in the step S60. At this time, for the road to be traversed that was set in the step S30, the route guidance is performed based upon the original links before replacement by the virtual link.

In a step S80, a decision is made as to whether or not the vehicle has arrived at the destination. If the vehicle has arrived at the destination, then the flowchart of FIG. 3 terminates. Due to this, route guidance to the destination also terminates. However, if the vehicle has not yet arrived at the destination, then the flow of control proceeds to a step S90.

From the step S90 to a step S120, rerouting processing is performed when the vehicle has deviated from the recommended route. In the step S90, a decision is made as to whether or not the vehicle has deviated from the recommended route. If the vehicle position is not upon the recommended route so that it is decided that the vehicle has deviated from the recommended route, then the flow of control proceeds to a next step S100. On the other hand, if it has been decided that the vehicle has not deviated from the recommended route, then the flow of control returns to the step S70, and route guidance is continued.

In the step S100, a decision is made as to whether or not the vehicle was running upon the road to be traversed that was set in the step S30, until directly before it deviated from the recommended route. If the vehicle was running upon the road to be traversed, then the flow of control proceeds to a step S110. However, if the vehicle was not running upon the road to be traversed, then the flow of control is transferred to the step S120 without executing the step S110.

In the step S110, the setting of the virtual link for the road to be traversed is cancelled. In other words, it is arranged for the route search calculation to be per formed using the original links, i.e. without replacing the links for the road to be traversed by a virtual link.

In the step S120, a second search for a recommended route is performed. At this time, if the setting of a virtual link has been cancelled by executing the step S110, then, for the road to be traversed, the route search calculation is performed based upon the link costs of the original links, i.e. not upon the link cost that has been set for the virtual link. On the other hand, if it was decided in the step S100 that the vehicle was not running upon the road to be traversed, then, in the same manner as when searching for a recommended route in the step S50, the route search calculation is performed based upon the link cost of the virtual link, and not upon the original link costs for the road to be traversed. When the step S120 has been executed, the flow of control returns to the step S70, and route guidance is performed based upon the new recommended route that has been found for a second time.

As has been explained above, the recommended route to the destination is searched for, and route guidance to the destination is performed according to this recommended route.

According to the embodiment described above, the following advantageous effects are achieved.

(1) A road to be traversed between the departure point and the destination is set (in the step S30), and the plurality of links that constitute this road to be traversed are replaced by a virtual link whose link cost is set to be smaller than the total of the link costs of this links (in the step S40). A recommended route from the departure point to the destination is searched for (in the step S50), based upon the link costs set for each of the links that constitute the roads other than the road to be traversed, and the link cost set for the virtual link replaced in the step S40. Since this is done, along with setting a route to the destination so as to pass along this road if the designated road is appropriate, also it is possible to set a route to the destination in an appropriate manner without passing along this road, if the designated road is not appropriate.

(2) When setting the road to be traversed in the step S30, it is possible to set a road that has been designated by the user upon the map displayed upon the display monitor 16 as the road to be traversed. If this is done, it is possible for the user to set, in a simple manner, the road to be traversed that he considers that he wishes to pass along en route.

(3) If specified traffic regulation information is set for any one of the links that constitute the road to be traversed, traffic regulation information with the same details is set for the virtual link as well. Since this is done, it is possible to prevent a recommended route that cannot actually be pursued from being mistakenly found as a result of route search calculation using the virtual link.

(4) The decision as to whether or not to use the virtual link is made (in the step S20) by deciding whether or not the usage condition for the virtual link is satisfied. At this time, it is decided whether or not to use the virtual link by taking, as a usage condition for the virtual link, the result of setting a search condition for the recommended route that has been set by the user in advance, or the calendar or time or the like. If as a result it is decided not to use the virtual link, then, by not executing the steps S30 and S40, the recommended route is searched for in the step S50 based upon the link costs set for each of the links that constitute all of the roads, in other words the road to be traversed and also the roads other than the road to be traversed, without using the virtual link. Since this is done, it is possible to find the optimum recommended route while changing over between whether the virtual link is used or not, according to the situation.

(5) When the vehicle deviates from the recommended route (in the step S90), by executing rerouting processing, a new recommended route to the destination is found for a second time (in the step S120), by taking the vehicle position at this time as the departure point. At this time, if the vehicle has deviated from the road to be traversed that is included in the recommended route (in the step S100), then the step S120 is executed after canceling the setting of the virtual link (in the step S110). Due to this, in the step S120, a new recommended route is searched for a second time based upon the link costs that have been set for each of the links that constitute both the road to be traversed and the roads other than the road to be traversed, without using the virtual link. Since this is done, if, while passing along the road to be traversed that has been set as a portion of the recommended route, the user has stopped following this road to be traversed partway along it, then it is possible to search for a second time for an appropriate recommended route by rerouting processing.

It should be understood that, in the embodiment described above, it was arranged to set a fixed link cost for the virtual link that was smaller than the value of the total of the costs of the original links. However, it would also be acceptable to arrange to change the value of this link cost according to the situation on the roads. If this is done, it is possible to set a recommended route that is adapted to the road situation. For example, it would be possible to change the link cost of the virtual link based upon road traffic information that is supplied by a road traffic information communication system (VICS). In other words, the state of congestion of the road to be traversed that has been set would be decided upon by receiving road traffic information that is transmitted from a VICS center via a FM multiplex broadcast or a beacon. As a result, if it is decided that the road to be traversed is congested, a link cost is set for the virtual link that is close to the value of the total of the costs of the original links, so that the link cost of the virtual link is lower, the less severe is the state of congestion.

Or the state of congestion in the past for each day of the week or for each time may be recorded as statistical traffic information, and the present state of congestion may be decided upon based upon this statistical traffic information. If, as a result, it has been decided that congestion upon the road to be traversed that has been set is terrible, then a link cost is set for the virtual link that is close to the value of the total of the costs of the original links, so that the link cost of the virtual link is lower, the less severe is the state of congestion.

Figure 4:
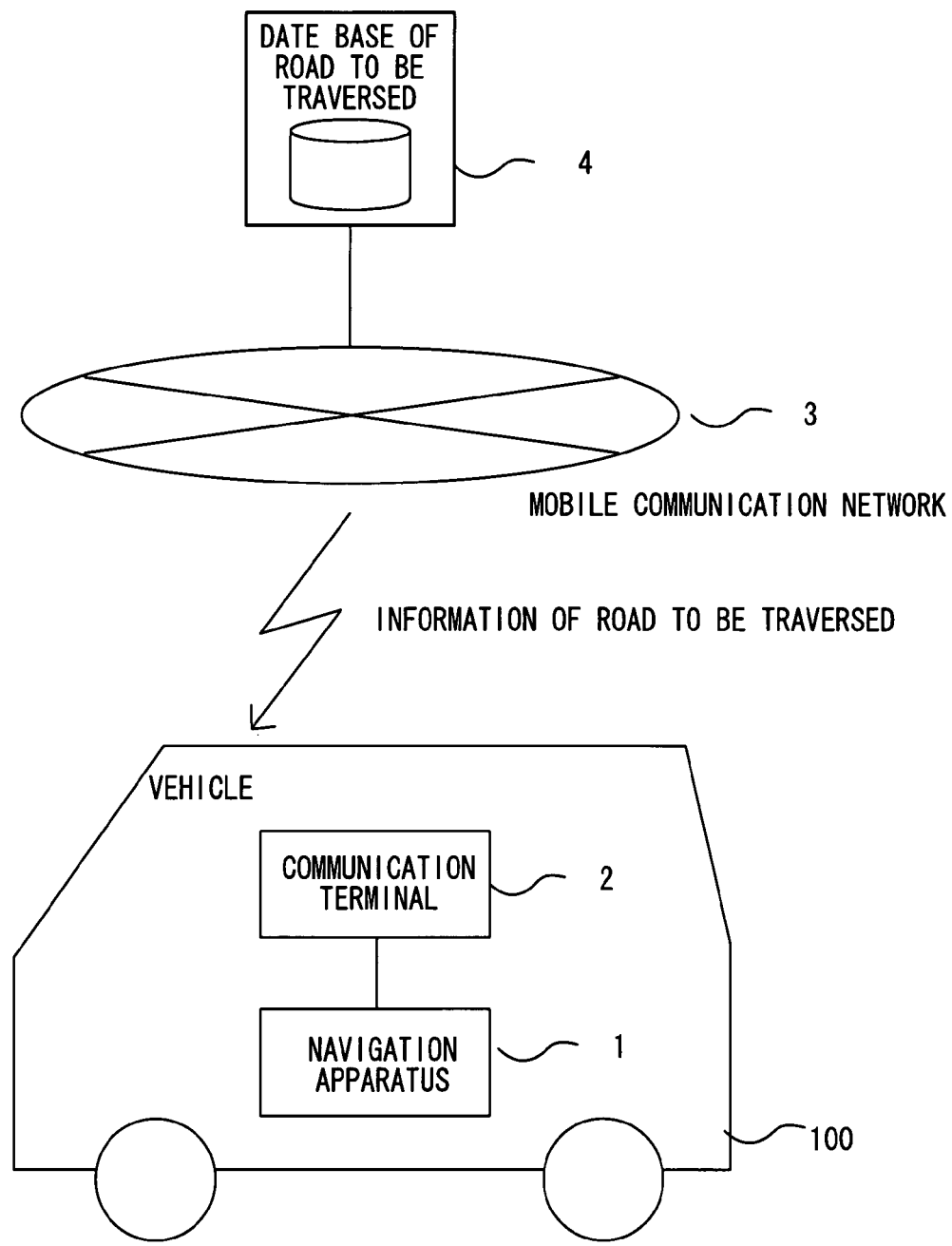
FIG. 4 is a figure showing an example of a structure for a navigation system that sets a road to be traversed, based upon information transmitted from the outside.

Furthermore, it would also be acceptable for the setting of the road to be traversed, not to be performed according to designation by the user, who is himself the driver of the vehicle, but rather to be performed based upon information that is transmitted externally. FIG. 4 is a figure showing an example of the structure of a navigation system in which a road to be traversed is set based upon information that is transmitted from the outside. The navigation apparatus 1 is provided to a vehicle 100, and is connected to a communication terminal 2. A portable telephone or the like may, for example, be used as this communication terminal 2. This communication terminal 2 is connected to a mobile communication network 3 by wireless. And a data base 4 of roads to be traversed is connected to the mobile communication network 3. In other words, the navigation apparatus 1 is connected to the data base 4 of roads to be traversed via the mobile communication terminal 2 and the mobile communication network 3. Database information that has been collected in advance for roads that various types of user pass along preferentially is recorded in this data base 4 of roads to be traversed.

When the navigation apparatus 1 is connected to the data base 4 of roads to be traversed via the communication terminal 2 and the mobile communication network 3, this navigation apparatus 1 requests information of a road to be traversed from the data base 4 of roads to be traversed. In response to this request from the navigation apparatus 1, the data base 4 of roads to be traversed determines a road to be traversed based upon the data base information described above, and transmits to the navigation apparatus 1 the information of the road to be traversed, for specifying this road to be traversed upon the map. And the navigation apparatus 1 receives this information of the road to be traversed that has been transmitted from the data base 4 of roads to be traversed via the mobile communication network 3 and the communication terminal 2, and sets the road to be traversed based upon this information of the road to be traversed that has been received. By doing this, it is possible to set the road to be traversed based upon the information that is transmitted externally.

The embodiments described above are only examples; when interpreting the invention, there are no limitations or constraints upon the correspondence relationship between the items described in the embodiments, and the items described in the claims. Furthermore, provided that the distinguishing features of the invention are not omitted, the present invention is not limited to these contents.

What is claimed is:

1. A navigation apparatus, comprising:
   a road setting unit that sets a road to be traversed between a departure point and a destination, the road being constituted by links for each of which a predetermined link cost is set;
   a replacement unit that replaces the links constituting the road to be traversed that has been set by the road setting unit, with a virtual link whose link cost is set to be smaller than the total of the link costs of the links for the road to be traversed; and
   a route search unit that searches for a recommended route from the departure point to the destination, based upon link costs set for links that constitute roads other than the road to be traversed, and the link cost set for the virtual link with which the links for the road to be traversed has been replaced by the replacement unit.

2. A navigation apparatus according to claim 1, wherein:
   the road setting unit sets, as the road to be traversed, a road designated by a user upon a map displayed upon a display monitor.

3. A navigation apparatus according to claim 1, wherein:
   if specific traffic regulation information is set for any one of the links that constitute the road to be traversed, the replacement unit also sets traffic regulation information with the same details for the virtual link.

4. A navigation apparatus according to claim 1, further comprising a decision unit that decides whether or not to use the virtual link, and wherein:
   if it has been decided by the decision unit not to use the virtual link, then the route search unit searches for the recommended route, not using the virtual link, but rather based upon the link costs set for each of the links that constitute the road to be traversed, and the link costs set for the links that constitute the roads other than the road to be traversed.

5. A navigation apparatus according to claim 4, wherein:
   the decision unit decides whether or not to use the virtual link, based upon a set result of a search condition set in advance by a user for the recommended route.

6. A navigation apparatus according to claim 4, wherein:
   the decision unit decides whether or not to use the virtual link, based upon the calendar day and/or the time.

7. A navigation apparatus according to claim 1, further comprising a rerouting unit that, if a subject vehicle deviates from the recommended route, conducts a reroute search for a new recommended route to the destination, using a position of the subject vehicle at this time as a departure point, and wherein:

if the subject vehicle deviates from the road to be traversed that is included in the recommended route, the rerouting unit conducts the reroute search for the new recommended route, based upon the link costs set for each of the links that constitute the road to be traversed, and the link costs set for the links that constitute the roads other than the road to be traversed, without using the virtual link.

8. A navigation apparatus according to claim 1, further comprising:
a congestion decision unit that decides upon the state of congestion of the road to be traversed; and
a link cost change unit that changes the link cost set for the virtual link, according to the result of decision of congestion state for the road to be traversed by the congestion decision unit.

9. A navigation apparatus according to claim 8, wherein:
the congestion decision unit decides upon the state of congestion of the road to be traversed, based upon road traffic information that is transmitted by a road traffic information communication system center.

10. A navigation apparatus according to claim 8, wherein:
the congestion decision unit decides upon the state of congestion of the road to be traversed, based upon statistical traffic information in which past states of congestion for each day of the week or time are recorded.

11. A navigation system, comprising:
a navigation apparatus including
a road setting unit that sets a road to be traversed between a departure point and a destination, the road being constituted by links for each of which a predetermined link cost is set;
a replacement unit that replaces the links constituting the road to be traversed that has been set by the road setting unit, with a virtual link whose link cost is set to be smaller than the total of the link costs of the links for the road to be traversed; and
a route search unit that searches for a recommended route from the departure point to the destination, based upon link costs set for links that constitute roads other than the road to be traversed, and the link cost set for the virtual link with which the links for the road to be traversed has been replaced by the replacement unit;
a data base unit in which information about roads along which various types of user preferentially pass is recorded;
a road to be traversed determination unit that determines a road to be traversed, based upon the information recorded in the data base unit; and
a transmission unit that transmits, to the navigation apparatus, information of the road to be traversed for specifying upon a map the road to be traversed that has been determined by the road to the traversed determination unit; and wherein:
the road setting unit sets the road to be traversed based upon the information of the road to be traversed that is transmitted from the transmission unit.

12. A navigation apparatus according to claim 2, wherein:
if specified traffic regulation information is set for any one of the links that constitute the road to be traversed, the replacement unit sets traffic regulation information of the same details for the virtual link as well.

13. A navigation apparatus according to claim 2, further comprising a decision unit that decides whether or not to use the virtual link, and wherein:
if it has been decided by the decision unit not to use the virtual link, then the route search unit searches for the recommended route, not using the virtual link, but based upon the link costs set for each of the links that constitute the road to be traversed, and upon the link costs set for the links that constitute the roads other than the road to be traversed.

14. A navigation apparatus according to claim 3, further comprising a decision unit that decides whether or not to use the virtual link, and wherein:
if it has been decided by the decision unit not to use the virtual link, then the route search unit searches for the recommended route, not using the virtual link, but based upon the link costs set for each of the links that constitute the road to be traversed, and upon the link costs set for the links that constitute the roads other than the road to be traversed.

15. A navigation apparatus according to claim 12, further comprising a decision unit that decides whether or not to use the virtual link, and wherein:
if it has been decided by the decision unit not to use the virtual link, then the route search unit searches for the recommended route, not using the virtual link, but based upon the link costs set for each of the links that constitute the road to be traversed, and upon the link costs set for the links that constitute the roads other than the road to be traversed.

16. A route search method for a navigation apparatus, comprising:
setting, by a road setting unit, a road to be traversed between a departure point and a destination, the road being constituted by links for each of which a predetermined link cost is set;
replacing, by a replacement unit, the links constituting the road to be traversed with a virtual link whose link cost is set to be smaller than the total of the link costs of the links for the road to be traversed; and
searching, by a route search unit, for a recommended route from the departure point to the destination, based upon link costs set for links that constitute roads other than the road to be traversed, and the link cost set for the virtual link with which the links for the road to be traversed has been replaced.

17. A route search method for a navigation system, comprising:
determining, by a data base, a road to be traversed based upon information about roads along which various types of user preferentially pass recorded in the data base;
transmitting, from the data base, information of the road to be traversed for specifying upon a map the road to be traversed that has been determined;
setting, by a road setting unit, the road to be traversed between a departure point and a destination, the road being constituted by links for each of which a predetermined link cost is set, based upon the information of the road to be traversed that is transmitted;
replacing, by a replacement unit, the links constituting the road to be traversed with a virtual link whose link cost is set to be smaller than the total of the link costs of the links for the road to be traversed; and
searching, by a route search unit, for a recommended route from the departure point to the destination, based upon link costs set for links that constitute roads other than the road to be traversed, and the link cost set for the virtual link with which the links for the road to be traversed has been replaced.

* * * * *